Dec. 12, 1961 J. H. GIVEN 3,012,276
METHOD AND APPARATUS FOR EXTRUDING PLASTIC CONDUIT
Filed Aug. 4, 1960 6 Sheets-Sheet 1

INVENTOR
JOSEPH H. GIVEN

BY *Schmieding and Fultz*

ATTORNEYS

Dec. 12, 1961 J. H. GIVEN 3,012,276
METHOD AND APPARATUS FOR EXTRUDING PLASTIC CONDUIT
Filed Aug. 4, 1960 6 Sheets-Sheet 2
FIG. 2
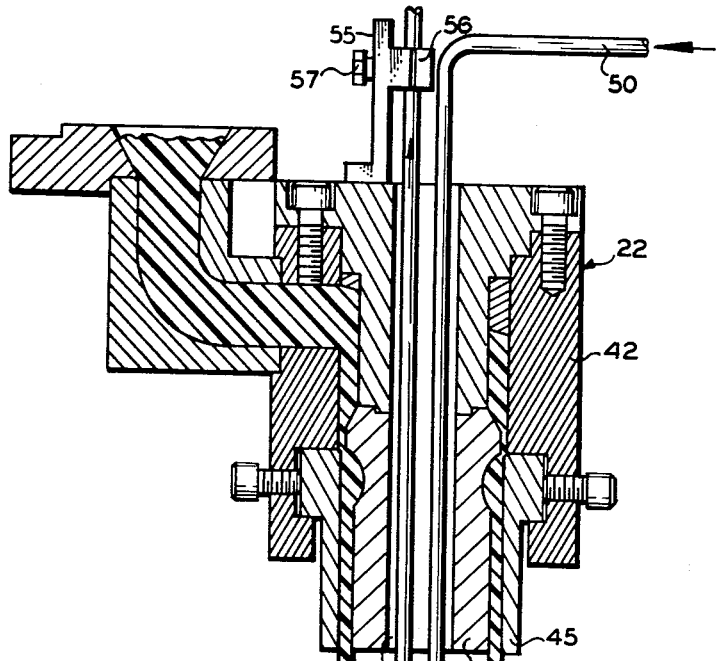
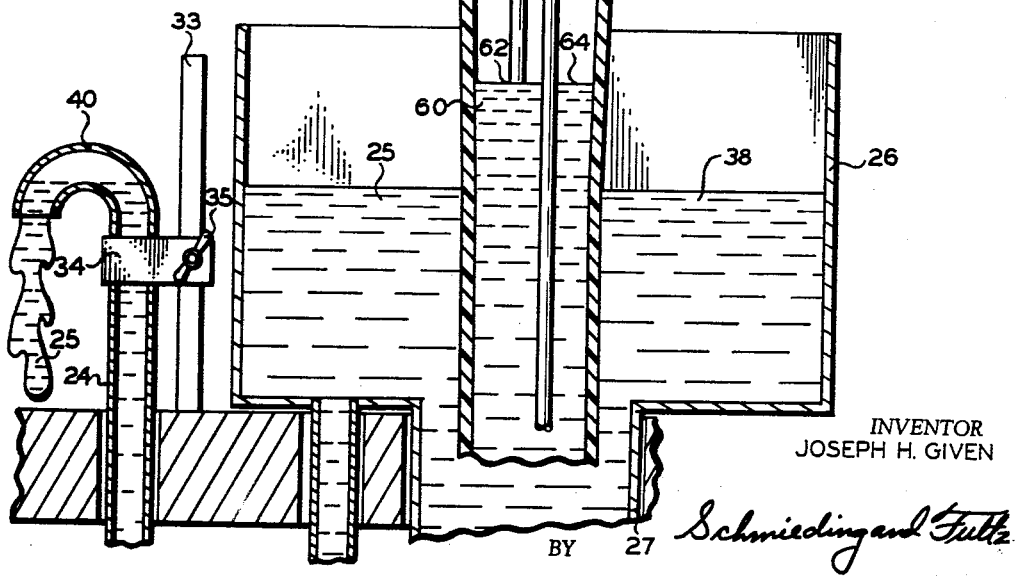
INVENTOR
JOSEPH H. GIVEN
BY Schmieding and Fultz
ATTORNEYS Dec. 12, 1961  J. H. GIVEN  3,012,276
METHOD AND APPARATUS FOR EXTRUDING PLASTIC CONDUIT
Filed Aug. 4, 1960  6 Sheets-Sheet 3
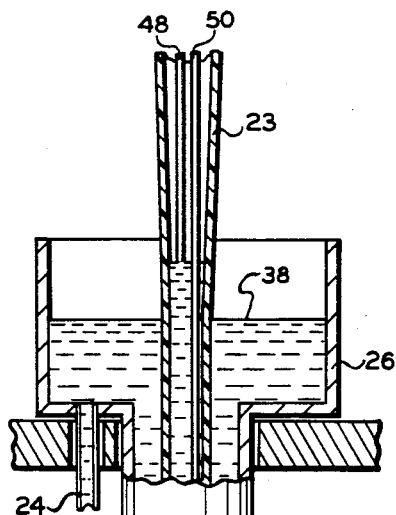
FIG. 3
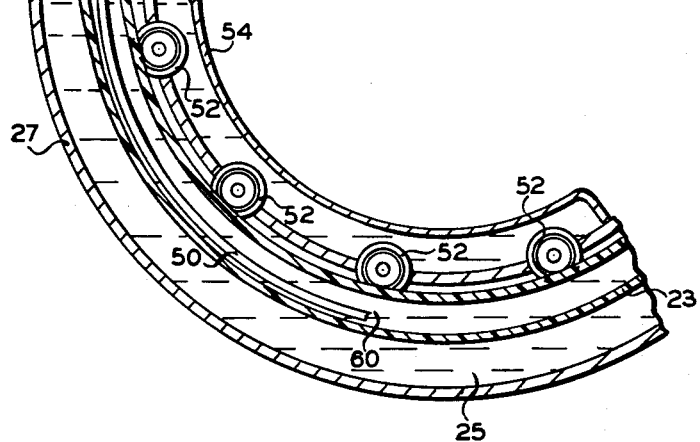
INVENTOR
JOSEPH H. GIVEN
BY *Schmieding and Fultz*
ATTORNEYS Dec. 12, 1961   J. H. GIVEN   3,012,276
METHOD AND APPARATUS FOR EXTRUDING PLASTIC CONDUIT
Filed Aug. 4, 1960   6 Sheets-Sheet 6

INVENTOR.
JOSEPH H. GIVEN
BY
Schmieding and Fultz
ATTORNEYS

United States Patent Office 3,012,276
Patented Dec. 12, 1961

3,012,276
METHOD AND APPARATUS FOR EXTRUDING PLASTIC CONDUIT
Joseph H. Given, Columbus, Ohio, assignor to The Plastex Company, Columbus, Ohio, a corporation of Ohio
Filed Aug. 4, 1960, Ser. No. 47,893
13 Claims. (Cl. 18—14)

This application relates to method and apparatus for producing plastic conduit by extrusion.

The present application is a continuation-in-part of my co-pending application Serial No. 801,896, filed March 25, 1959.

In general, the apparatus of the present invention includes a conventional extruding machine for continuously supplying a flow of plastic material to a die means provided with a vertically downwardly facing die outlet. The die means shapes the flowing plastic material into conduit form and discharges same into a coolant bath. The moving conduit continuously progresses downwardly through said bath and thence upwardly and out of the bath to a station where the conduit is coiled and packaged for use. The coolant bath surrounds the moving plastic conduit for a relatively long extent thereof and is relatively deep whereby rapid and highly efficient cooling is continuously applied to the moving plastic conduit. A plurality of rollers is provided at the exit of the bath for continuously and adjustably applying tension to the moving plastic conduit.

In accordance with the present invention, the interior of the moving plastic conduit, as it moves through the above described bath, is maintained full of coolant liquid which balances the inwardly directed hydrostatic force exerted on the outer wall of the conduit by the relatively deep surrounding bath. The conduit is thereby prevented from collapsing as it is cooled.

The apparatus of the present invention includes novel means for varying the surface level of the coolant bath surrounding the conduit and also the surface level of the coolant within the conduit relative to the location of the outlet of the die means. By varying the surface level of the coolant bath, surrounding the conduit, the predetermined required outside diameter for the conduit can be readily and accurately established. Moreover, when the previously mentioned tension applied to the conduit beyond the bath, is varied, in combination with varying the surface level of the coolant surrounding the conduit, then both the predetermined required outside diameter and wall thickness of the conduit can be readily and accurately established and maintained.

In operating the apparatus of the present invention it has been found that if the surface level of the coolant within the conduit is maintained higher than the surface level of the coolant bath, surrounding the conduit, a pre-cooling effect is imposed on the flowing plastic conduit prior to its entry into the main coolant bath. This prevents the flowing plastic material from being suddenly subjected to an extreme change in temperature with the result that a superior exterior wall surface finish is obtained.

It is therefore an object of the present invention to provide apparatus for producing plastic conduit which apparatus includes novel means for more rapidly and efficiently cooling the conduit whereby the flow rate for production thereof is greatly increased.

It is another object of the present invention to provide apparatus for producing plastic conduit which apparatus includes novel means for readily and accurately establishing the precise diameter of the plastic conduit being formed. Hence the extruding machine can be rapidly re-tooled for the production of a different size of conduit with the result that the non-production time of the machine is greatly reduced.

It is another object of the present invention to provide apparatus for producing plastic conduit which includes means for pre-cooling the flowing conduit prior to its entry into a main coolant bath whereby a superior wall finish is obtained.

It is another object of the present invention to provide an apparatus for producing plastic conduit which apparatus includes novel means for readily and accurately establishing both the diameter and wall thickness of the plastic conduit being formed.

Further objects and advantages of the present invention will be apparent from the following description, reference being had to the accompanying drawings wherein preferred forms of embodiments of the invention are clearly shown.

In the drawing:

FIG. 2 is a side sectional view of a side means comprising a portion of the apparatus of FIG. 1;

FIG. 3 is a partial side elevational view of a container and coolant bath comprising a portion of the apparatus of FIG. 1;

Figure 1:
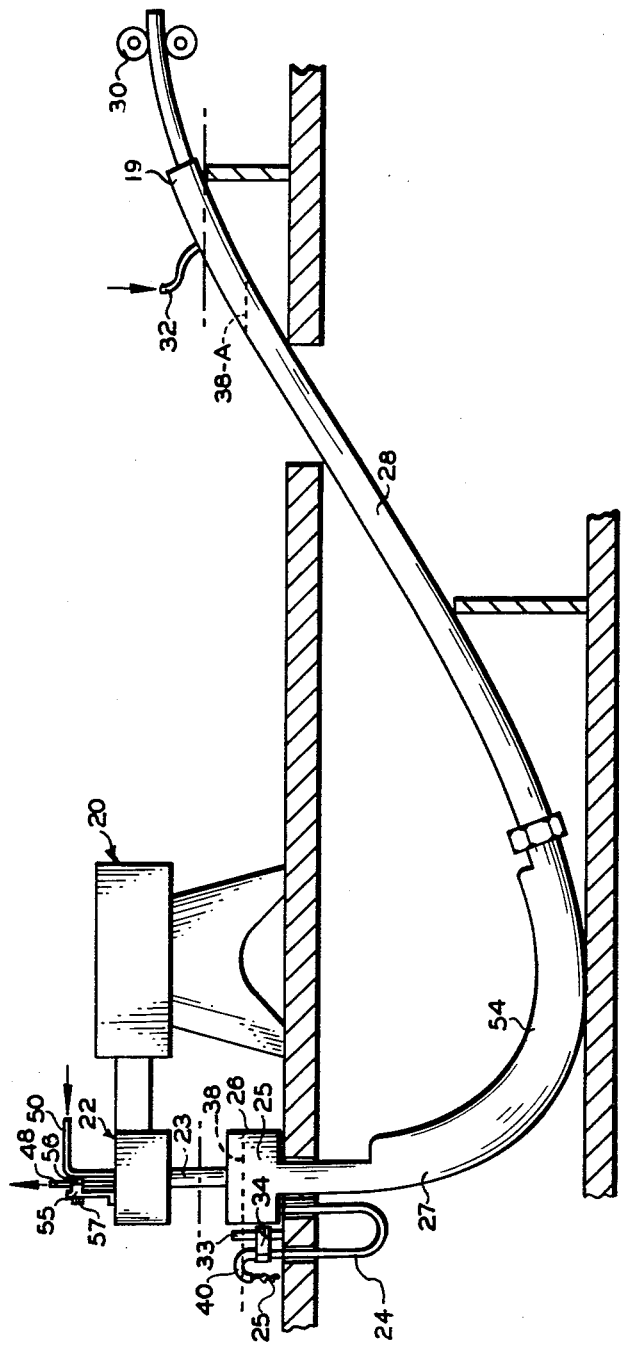
FIG. 1 is a side elevational view of an apparatus for producing plastic conduit, said apparatus being constructed in accordance with the present invention.

Referring in detail to the drawing the apparatus of the present invention includes a conventional extruding machine, indicated generally at 20, which is of a type well known to the art, and serves to continuously supply a flow of plastic material to a die means indicated generally at 22. The die means shapes the flowing plastic material into conduit form as seen at 23 in FIG. 1, and the flowing conduit passes downwardly into a coolant bath 25 contained in a container 26 and pipe sections 27 ad 28.

The moving pipe 23 emerges from the bath 25 at an exit end 26 of conduit section 28 and is engaged by a plurality of driven rollers 30 which frictionally engage the walls of the conduit. The speed of rotation of rollers 30 can be precisely and variably controlled, by means of a suitable variable speed drive, to provide means for adjustably varying the tension being continuously applied to the moving plastic conduit.

Coolant bath 25 is continuously supplied with a flow of coolant through an intake line 32 and a flow of coolant 25 is continuously withdrawn from the coolant bath through a vertically adjustable flexible hose 24. Hose 24 is vertically adjustably secured to an upright member 33 by a clamping bracket 34 provided with a thumb screw 35. It will be understood that the level of the surface 38 of coolant bath 25 is determined by the vertical location of horizontal hose portion 40. When horizontal hose portion 40 is moved upwardly the surface level 38 of bath 25 is raised, and conversely, when horizontal hose portion 40 is lowered surface level 38 is moved downwardly. Surface level 38-A at the outlet 19 of pipe section 28 will of course be the same as surface level 38 in container 26.

Reference is next made to FIGS. 2 and 3 which illustrate the interior details of the previously mentioned die means 22. The die means include a body portion 42 and a removable mandrel portion 43 that form a die outlet 45. Mandrel portion 43 includes a bore 46 through which are extended a vacuum line 48 and a water intake line 50. As seen in FIG. 3 water intake line 50 extends to the bottom of pipe section 27 and serves to continuously supply a flow of cold coolant to the bottom portion of a bath 60 within the walls of conduit 23. As the coolant is heated by contact with the relatively warm moving plastic conduit 23 it will rise towards the surface of the bath and thereby provide circulation within the bath.

A plurality of rollers 52 are spaced along the curved portion of pipe section 27 to prevent frictional engagement of conduit 23 with the inner wall of pipe section 27. A jacket 54 prevents the escape of coolant from between the rollers and the edges of the openings in which the rollers are mounted.

The upper end of vacuum line 48 is mounted to a bracket 55 by means of a screw clamp 56. Vacuum line 48 can be raised and lowered by loosening and then retightening threaded element 57.

Since water is continuously being removed from bath 60 at a lower end 62 of vacuum line 48 it will be understood that the level of lower end 62 of vacuum line 48 will establish the surface level 64 of bath 60 within the conduit 23.

Figure 4:
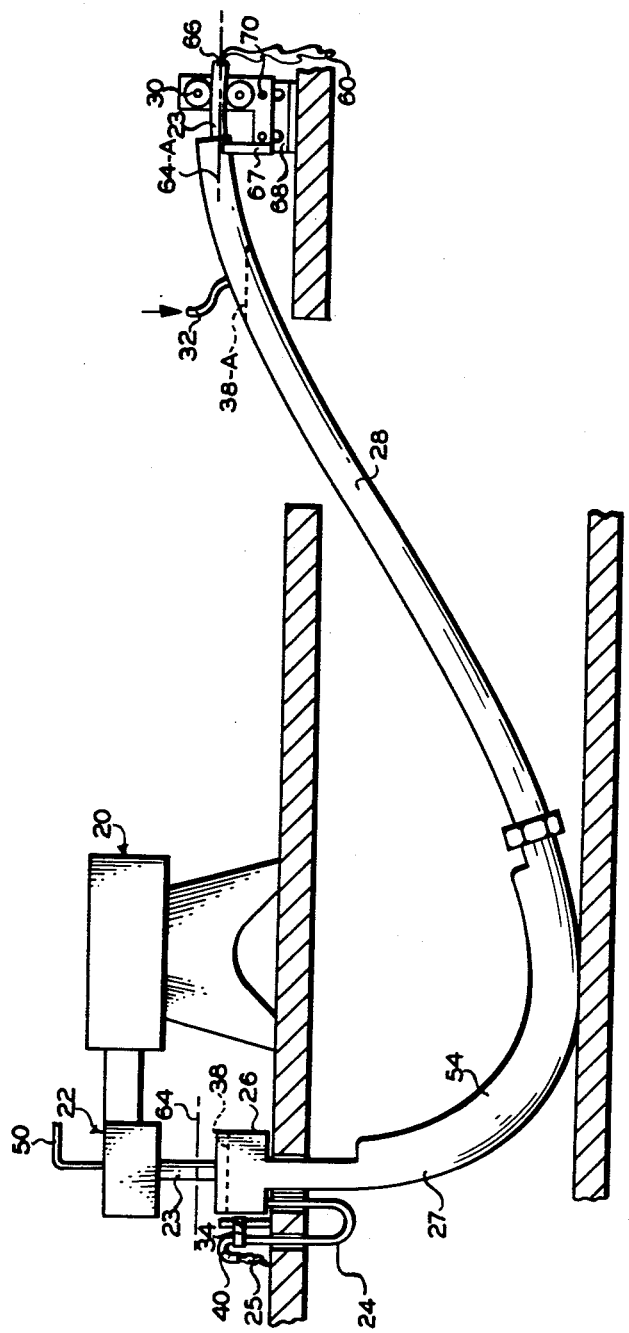
FIG. 4 is a side elevational view of a modified apparatus for producing plastic conduit, said apparatus being constructed in accordance with the present invention and comprising a second aspect thereof.

Reference is next made to FIG. 4 which shows an apparatus which comprises a modification of the apparatus of the preceding figures. Components of the apparatus of FIG. 4 which are identical of the preceding figures are designated by identical numerals.

The apparatus of FIG. 4 differs from that of the apparatus of the preceding figures in that the vacuum line 48, extending downwardly through mandrel 43, is eliminated and coolant from bath 60, within the moving plastic conduit, is continuously drained from an open end 66 of conduit 23 and the surface level 64 of bath 60 is varied by raising and lowering the end 66 of conduit 23. It will be understood that the surface level 64, in the bath portion 60 underlying the die means, FIG. 2, will be the same as the surface level 64-A of the discharge stream leaving the open end 66 of conduit 23, FIG. 4.

With continued reference to FIG. 4 the right end of pipe section 28 and hence the open end 66 of conduit 23 can be raised and lowered by raising and lowering an adjustable support and roller assembly 67 which is mounted on a stationary bracket 68. Threaded members 70 serve to clamp support 67 to bracket 68 at various positions of vertical adjustment to provide means for vertically adjusting the level 64-A of outlet stream 70 and hence the level 64 of bath 60 within the plastic conduit 23.

With continued reference to FIG. 4 coolant for bath 60 within conduit 23 is continuously supplied by a water intake line 50 extended downwardly through the bore 46 in mandrel portion 43 of a die means, see FIG. 2.

In operation of the apparatus of FIGS. 1 through 3, plastic material is caused to continuously flow through die means 22 and outwardly through die outlet 45. A series of driven rollers, two of which are shown at 30, continuously apply tension to the flowing plastic conduit whereby the flowing conduit assumes a downwardly and inwardly tapered configuration between die outlet 45 and the surface 38 of bath 25, as seen in FIG. 2. The moving plastic conduit 23 progresses downwardly through bath 25 in container 26 and pipe sections 27 and 28 and thence outwardly through discharge end 19.

After an extruding operation has been started, the operator measures the finished outside diameter of plastic conduit 23 to determine if it is running oversize or undersize. The wall thickness of the conduit is also checked for thickness.

If the diameter of conduit 23 is undersize surface level 38 of bath 25 is raised to cause the converging downwardly flowing conduit to setup closer to outlet 45 of die means 22 whereby the diameter of the conduit is increased.

If the conduit is running oversize surface level 38 of bath 25 is lowered to cause the downwardly converging conduit to setup at a greater distance from outlet 45 of the die means.

In varying surface level 38 threaded element 35 of clamp 34 is loosened to permit horizontal portion 40 of hose 24 to be moved and locked in a higher or lower position as required.

It is desirable to adjust surface level 64 of coolant bath 60 at a level higher than surface level 38 of the surrounding coolant bath in order to partially cool the downwardly flowing conduit 23 prior to its entry into surrounding coolant bath 25. This prevents the warm flowing plastic material from being suddenly subjected to an extreme change in temperature with the result that a much better exterior wall surface finish is obtained. The distance at which surface level 64 should be located above surface level 38 depends on the particular type of plastic composition being extruded. Hence, when it is desired to extrude a different type of material, it becomes necessary to vary the surface level 64 relative to surface level 38 in order to achieve the ultimate in exterior wall surface finish.

Surface level 64 of bath 60 is raised or lowered as required, by loosening threaded element 57 of clamp 56 which frees vacuum line 48 so that it can be adjusted upwardly and downwardly as required.

When it is desired to vary the wall thickness of the flowing conduit 23, the speed of rotation of tension rollers 30 is increased to decrease the wall thickness or decreased to increase the wall thickness. After the wall thickness has been adjusted it is usually necessary to raise or lower surface level 38 of coolant bath 25 to cause the flowing conduit to setup at the proper outside diameter. Surface level 64 of inner coolant bath 60 is then adjusted to provide the proper amount of precooling applied to the flowing conduit prior to its entry into coolant bath 25.

Reference is next made to FIG. 4 that illustrates a modification of the apparatus of FIG. 1 which comprises a second aspect of the present invention.

In the operation of the apparatus of FIG. 4, surface level 38 of bath 25 is varied by raising and lowering hose 40 in the manner previously described in connection with FIG. 1.

Surface level 64 of bath 60, however, is varied by raising and lowering support and roller assembly 67 on its supporting bracket 68. This raises or lowers surface level 64-A of the flowing stream of coolant 60 being discharged from the end of the plastic conduit at 66 which serves to raise and lower surface level 64 in the flowing conduit beneath die means 22.

It will be understood that with the apparatus of FIG. 4, the outside diameter, wall thickness, and superior surface finish can be controlled by varying the surface levels and magnitude of tension applied by rollers 30 in the manner previously described in connection with the apparatus of FIGS. 1 through 3.

Figure 5:
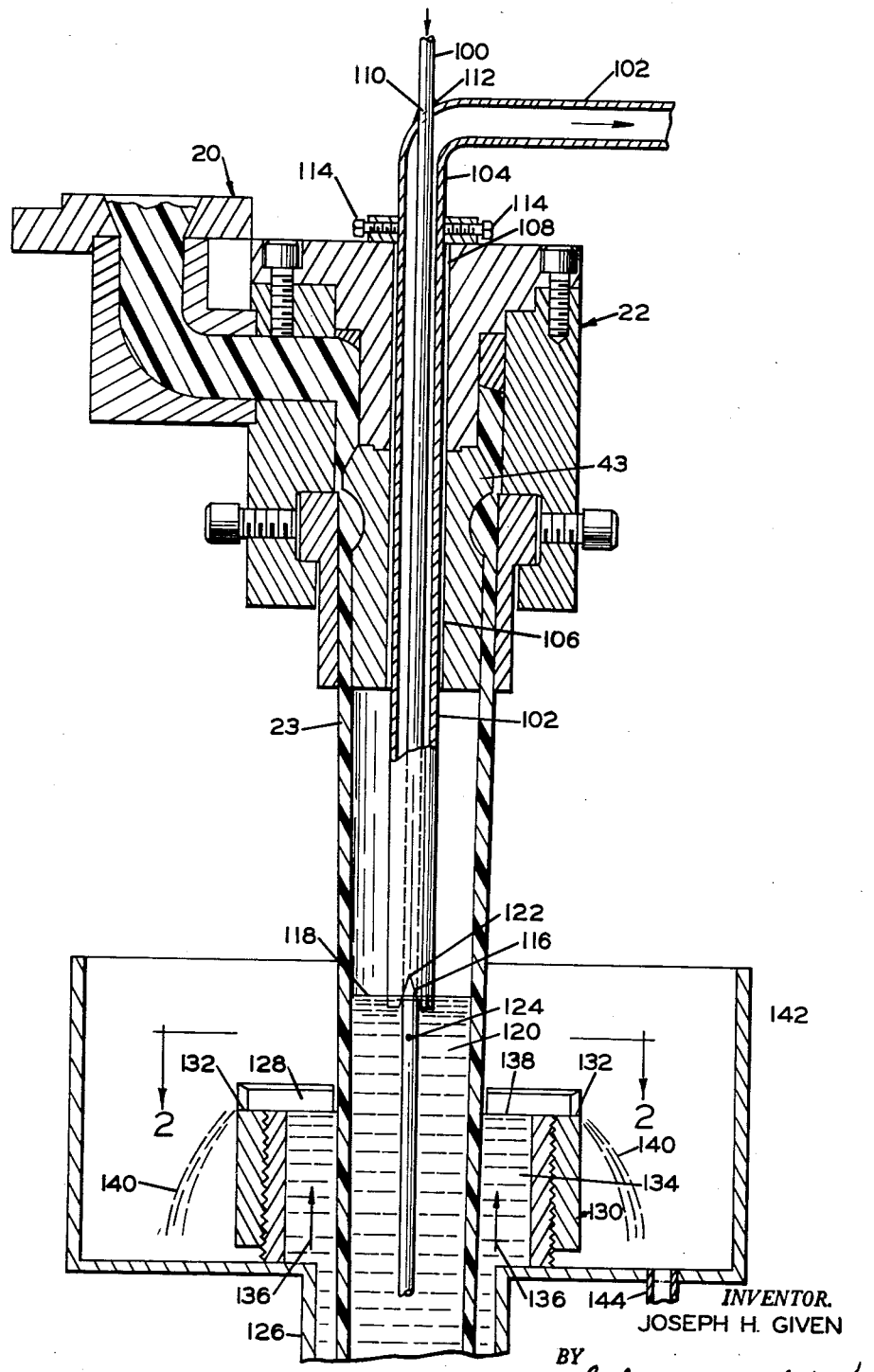
FIG. 5 is a side sectional view of a modified apparatus for producing plastic conduit, said apparatus being constructed in accordance with the present invention, the section being taken along a vertical plane through the center line of the apparatus.
Figure 6:
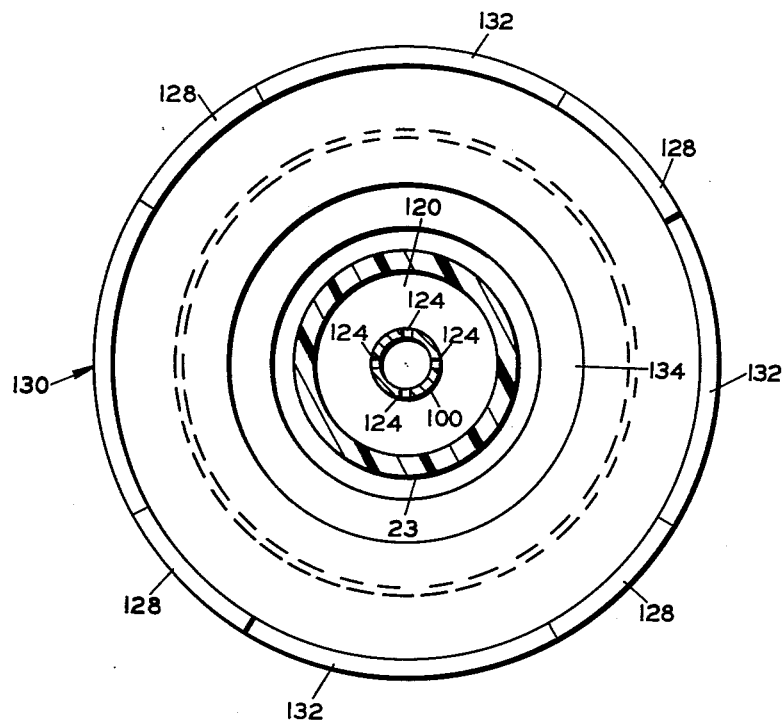
FIG. 6 is a top sectional view of a portion of the apparatus of FIG. 5, the section being taken along the line 6—6 of FIG. 5.

Reference is next made to FIGS. 5 and 6 which illustrate another modified apparatus constructed in accordance with the present invention which includes a conventional extruding machine, indicated generally at 20 that includes a die means 22 that shapes the flowing plastic material into a pipe or conduit 23.

The apparatus of FIGS. 5–6 differ from those previously described in that coolant intake tube 100 is extended centrally through coolant outlet tube 102. The outer wall 104 of outlet tube 102 is spaced from an inner surface 106 of the hole through mandrel 43 to provide an annular air course 108. Intake tube 100 is extended through a hole 110 in outlet tube 102 and is joined thereto at a soldered junction 112.

Outlet tube 102 is mounted on the die means and centered relative to air courses 108 by means of a plurality of set screws 114. The bottom end of outlet tube 102 is provided with two or more V-shaped notches 116 that form orifices for the escape of air introduced into conduit 23 via annular air course 108.

It has been found in accordance with the present invention that if air is not continuously introduced into the conduit 23, above the surface 118 of inner coolant bath 120, then the pump withdrawing the coolant through outlet tube 102 tends to raise the level of surface 118, in a pulsating manner, which causes variations in the diameter of conduit 23 as it passes into pulsating coolant. When, however, V-shaped notches 116 are provided the pump connected to outlet tube 102 can be provided with a proper air-water ratio to prevent surging and cavitation and cause the surface 118 of inner bath 120 to establish itself close to the apex 122 of V-notch 116.

In order to cause the surface level 118 to establish itself close to apex 122, without pulsations, it has been found it is necessary to regulate the coolant input delivered through coolant intake tube 120.

In order to obtain a steady rate of volumertic flow of coolant into the bath 120 and avoid pulsations in the level 118 of bath 120 a sensitive flow regulator, not illustrated, is connected between the source of coolant and intake tube 110.

This flow regulator permits the accurate maintenance of an appropriate intake flow rate for the particular volumetric flow rate required by the particular pump and by the particular size of plastic conduit being extruded.

The lower end of intake tube 100 extends into the lower regions of bath 120 and down into a surrounding cooling jacket 126 whereby colder coolant is released into the lower regions of the bath in the same manner previously described in connection with the apparatus of FIGS. 1–4. As the coolant rises it becomes warmer and tends to boil at the surface 118 of inner bath 120. This is prevented, however, by forming a plurality of minute orifices 124 through the wall of intake tube 120 at a location below the surface 118 of the bath.

The small orifices 124 deliver colder coolant just below the surface whereby the bath is cooled and maintained at a temperature below the boiling point. Moreover, since the apparatus is extremely sensitive to any horizontal temperature gradient which may exist along the surface zone 118, it has been found advantageous to release coolant 124 radially in a plurality of directions whereby the temperature of the surface zone of bath 120 is substantially equal on all sides of the intake and outlet tubes. For this reason two or more orifices equally spaced, radially, should be used to provide a uniform distribution of surface coolant.

Each of the orifices 124 should have a diameter of 14 thousandths (.014) of an inch for average installations where the diameter of the plastic pipe is between ¾ of an inch and 3 inches.

With continued reference to FIGS. 5 and 6 the upper edge 128 of an outer coolant container 130 is provided with a plurality of circumferentially spaced notches or weirs 132 that cause the rising water in outer coolant bath 134 to flow outwardly in a plurality of directions from the central portion of outer coolant bath 34. Since the coolant in outer bath 134 is introduced into cooling jacket 126, in the lower regions of the bath, the coolant when heated will rise with laminar flow indicated by the arrows 136. Since a laminar flow through a conduit is faster along the central portion of the conduit and slower adjacent the walls the water will tend to well up at the central portion of the surface 138 of outer bath 134. It will therefore be understood that the notches or weirs 132 cause the surface coolant to flow outwardly in a plurality of directions, rather than over only one side of the upper edge 126 and thereby uniformly remove the outer coolant 134 from a plurality of directions established by the plurality of circumferentially spaced notches or weirs 132 formed in upper edge 128. This forms the plurality of small cascades, two of which are illustrated at 140 in FIG. 5.

It should be pointed out that if the weirs or notches 132 were not provided the rising outer coolant in bath 134 would spill over only one side of upper edge 128. This would cause nonuniform laterally flowing surface currents which would cause the flowing plastic conduits 23 to drift from the center of outer coolant bath 134. Moreover, the cooling effect on the flowing conduit 23 would be nonuniform and cause distortion of the shape of the flowing conduit 23.

An outer basin 142 receives the overflow from the notches or weirs 132 and releases the coolant through a drain 144.

While the form of embodiment of the present invention as herein disclosed constitutes a preferred form, it is to be understood that other forms might be adopted, all coming withing the scope of the claims which follow.

I claim:

1. The steps in the method of producing plastic conduit which method comprises flowing plastic material through a die means to form a cylindrical conduit of plastic material; passing said conduit through a liquid bath wherein said liquid surrounds said conduit to a predetermined level and forms a cooling zone; continuously supplying colder coolant liquid to the interior of said conduit at a location therein below the surface of said liquid bath; continuously withdrawing warmer coolant liquid from within said conduit to establish a predetermined surface level within said conduit; continuously supplying air to the interior of said conduit above said predetermined surface level; and continuously withdrawing air from within said conduit along with said liquid being withdrawn.

2. The steps in the method of producing plastic conduit which method comprises flowing plastic material through a die means to form a cylindrical conduit of plastic material; passing said conduit through a liquid bath wherein said liquid surrounds said conduit to a predetermined outer surface level and forms a cooling zone; continuously supplying colder coolant liquid to the interior of said conduit at a discharge location therein below said outer surface level of said liquid bath; continuously withdrawing warmer coolant liquid from within said conduit to establish a predetermined inner surface level within said conduit; and continuously discharging a small flow of colder liquid below said inner surface level and above said discharge location to maintain the temperature of the liquid within said conduit below its boiling point.

3. The method of claim 2 wherein air is continuously supplied to and withdrawn from the interior of said conduit above said predetermined inner surface level.

4. The steps in the method of producing plastic conduit which method comprises flowing plastic material through a die means to form a cylindrical conduit of plastic material; passing said conduit through a liquid bath wherein said liquid surrounds said conduit to a predetermined level and forms a cooling zone; continuously supplying colder coolant to the lower regions of said liquid bath; continuously withdrawing liquid from the surface of said liquid bath by producing a plurality of flows that progress from the outer surface of said conduit in radially outwardly directions whereby said liquid is withdrawn at equal volumetric flow rates from a plurality of sides of said conduit; continuously supplying cold liquid to the interior of said conduit at a location therein below the surface of said liquid bath; and continuously withdrawing warmer coolant liquid from within said conduit at a predetermined surface level therein.

5. The method of claim 4 wherein air is continuously supplied to and withdrawn from within said conduit above said predetermined surface level.

6. The method of claim 4 wherein a small volumetric flow of colder coolant liquid is continuously released above the point of release of the main supply of colder coolant and below said predetermined surface level to maintain the temperature of said coolant at said surface level below its boiling point.

7. An apparatus for producing plastic conduit, said apparatus comprising, in combination, die means including a mandrel forming an annular die outlet; means for continuously flowing plastic material through said die means; a container of liquid coolant beyond said die outlet in surrounding relationship with said plastic conduit; a first tube communicating with the interior of said conduit and connected with a source of coolant liquid for supplying colder coolant liquid to the interior of said conduit; a second tube within said conduit and surrounding said first tube, said second tube being connected with a pump for continuously withdrawing warmer coolant liquid from the interior of said conduit, said second tube including a lower end provided with a plurality of circumferentially spaced notches forming air intake openings; and passage means for the admission of air to the interior of said conduit.

8. An apparatus for producing plastic conduit, said apparatus comprising, in combination, die means including a mandrel forming an annular die outlet; means for continuously flowing plastic material through said die means; a container of liquid coolant beyond said die outlet in surrounding relationship with said plastic conduit; a first tube extended through said mandrel and connected with a source of coolant liquid, said first tube including a lower portion provided with a discharge opening for supplying colder coolant liquid to the interior of said conduit; a second tube within said conduit and surrounding said first tube, said second tube being connected with a pump and including a lower portion provided with an intake opening located above said discharge opening for continuously withdrawing warmer coolant liquid from the interior of said conduit, said first tube including a plurality of small circumferentially spaced orifices located below said intake opening and above said discharge opening; and passage means for the admission of air to the interior of said conduit.

9. An apparatus for producing plastic conduit, said apparatus comprising, in combination, die means including a mandrel forming an annular die outlet; means for continuously flowing plastic material through said die means; a container of liquid coolant beyond said die outlet in surrounding relationship with said plastic conduit; a first tube extended through said mandrel and connected with a source of coolant liquid, said first tube including a lower portion provided with a discharge opening for supplying colder coolant liquid to the interior of said conduit; a second tube within said conduit and surrounding said first tube, said second tube being connected with a pump for continuously withdrawing warmer coolant liquid from the interior of said conduit, said second tube including a lower portion provided with a coolant intake opening and a plurality of circumferentially spaced notches forming air intake openings, said first tube including a plurality of small circumferentially spaced orifices located above said discharge opening and below said intake openings of said second tube; and passage means for the admission of air to the interior of said conduit.

10. An apparatus for producing plastic conduit, said apparatus comprising, in combination, die means including a mandrel forming an annular die outlet; means for continuously flowing plastic material through said die means; a container of liquid coolant beyond said die outlet in surrounding relationship with said plastic conduit, said container including an upper end portion provided with a plurality of circumferentially spaced weirs for releasing a plurality of radially outwardly directed flows having substantially equal volumetric flow rates; a first tube communicating with the interior of said conduit and connected with a source of coolant liquid, said first tube including a discharge opening for supplying colder coolant liquid to the interior of said conduit; and a second tube surrounding said first tube and including a coolant intake opening located above said discharge opening of said first tube.

11. The apparatus defined in claim 10 wherein said die means includes a passage for supplying air to the interior of said conduit and wherein the lower end of said second tube is provided with a plurality of circumferentially spaced air outlet passages for withdrawing air from within said conduit.

12. The apparatus defined in claim 10 wherein said first tube includes a plurality of circumferentially spaced orifices located below said lower end of said second tube.

13. The apparatus defined in claim 10 wherein said die means includes a passage for supplying air to the interior of said conduit, wherein the lower end of said second tube is provided with a plurality of circumferentially spaced air outlet passages for withdrawing air from within said conduit; and wherein said first tube includes a plurality of circumferentially spaced orifices located below said lower end of said second tube.

References Cited in the file of this patent

UNITED STATES PATENTS

| | | |
|---|---|---|
| 2,097,684 | Atkinson | Nov. 2, 1937 |
| 2,176,925 | Reichel et al. | Oct. 24, 1939 |
| 2,452,080 | Stephenson | Oct. 26, 1948 |
| 2,541,064 | Irons | Feb. 13, 1951 |
| 2,634,459 | Irons | Apr. 14, 1953 |
| 2,717,424 | Francis et al. | Sept. 13, 1955 |